United States Patent
Bergman et al.

(10) Patent No.: US 10,538,450 B2
(45) Date of Patent: Jan. 21, 2020

(54) LAMINATED GLASS STRUCTURE AND METHOD OF MANUFACTURE

(71) Applicant: Corning Incorporated, Corning, NY (US)

(72) Inventors: Richard Bergman, Horseheads, NY (US); Thierry Luc Alain Dannoux, Avon (FR); Charles Michael Darcangelo, Corning, NY (US); David Alan Deneka, Corning, NY (US); Stuart Gray, Corning, NY (US); Priyank Paras Jain, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 590 days.

(21) Appl. No.: 14/763,420

(22) PCT Filed: Jan. 23, 2014

(86) PCT No.: PCT/US2014/012677
§ 371 (c)(1),
(2) Date: Jul. 24, 2015

(87) PCT Pub. No.: WO2014/116788
PCT Pub. Date: Jul. 31, 2014

(65) Prior Publication Data
US 2015/0368141 A1 Dec. 24, 2015

Related U.S. Application Data

(60) Provisional application No. 61/757,144, filed on Jan. 26, 2013, provisional application No. 61/829,660, filed on May 31, 2013.

(51) Int. Cl.
*C03B 29/00* (2006.01)
*C03B 23/023* (2006.01)
(Continued)

(52) U.S. Cl.
CPC ...... *C03B 23/0235* (2013.01); *B23K 26/3576* (2018.08); *B23K 26/40* (2013.01);
(Continued)

(58) Field of Classification Search
CPC ...... C03B 29/025; C03B 29/08; C03B 23/006
See application file for complete search history.

(56) References Cited

U.S. PATENT DOCUMENTS 1,829,647 A 10/1931 Hackett et al.
1,984,924 A * 12/1934 Fox .................. C03B 13/10
52/786.1

(Continued)

FOREIGN PATENT DOCUMENTS

GB 1564627 4/1980
JP 5020085 Y1 6/1975
(Continued)

OTHER PUBLICATIONS

European Patent Office; International Search Report; dated Apr. 14, 2014; pp. 1-3.
(Continued)

*Primary Examiner* — John M Hoffmann
(74) *Attorney, Agent, or Firm* — Gregory V. Bean

(57) ABSTRACT

Disclosed is a laminated glass structure with one or more inner glass layers with at least one in tension and two outer glass layers in compression wherein one or both of the outer layers at least partially wrap around the one or more inner layers at one or more of the edges of the laminated glass structure. Also disclosed is a process for forming a laminated glass structure, comprising providing a laminated glass structure, removing at least some glass from at least one the edges of the structure to produce a concavity in at the at least one edge and applying heat to the at least one edge.

8 Claims, 2 Drawing Sheets

(51) Int. Cl.
*C03B 29/02* (2006.01)
*C03B 29/08* (2006.01)
*B24B 9/10* (2006.01)
*B23K 26/40* (2014.01)
*C03B 33/023* (2006.01)
*B23K 26/352* (2014.01)
*B32B 17/10* (2006.01)
*C03C 15/00* (2006.01)
*C03C 19/00* (2006.01)
C03B 17/02 (2006.01)
C03B 25/02 (2006.01)
B23K 103/00 (2006.01)

(52) U.S. Cl.
CPC .......... *B24B 9/10* (2013.01); *B32B 17/10036* (2013.01); *B32B 17/10155* (2013.01); *C03B 29/025* (2013.01); *C03B 29/08* (2013.01); *C03B 33/023* (2013.01); *C03C 15/00* (2013.01); *C03C 19/00* (2013.01); B23K 2103/50 (2018.08); C03B 17/02 (2013.01); C03B 25/025 (2013.01); Y10T 428/2419 (2015.01); Y10T 428/24264 (2015.01)

(56) References Cited

U.S. PATENT DOCUMENTS

| | | | |
|---|---|---|---|
| 2,022,530 A | 11/1935 | White | |
| 2,290,088 A * | 7/1942 | Bleakley | C03B 23/20 52/306 |
| 2,592,620 A | 4/1952 | Tolkmith | |
| 3,281,227 A * | 10/1966 | Leflet, Jr. | C03B 23/0258 65/105 |
| 3,436,142 A * | 4/1969 | Siegmund | C03B 37/15 385/116 |
| 3,582,454 A * | 6/1971 | Giffen | C03B 9/12 428/130 |
| 3,592,620 A * | 7/1971 | Carlisi et al. | C03B 29/00 65/104 |
| 3,737,294 A | 6/1973 | Dumbaugh, Jr. et al. | |
| 3,746,526 A | 7/1973 | Giffon | |
| 3,762,904 A * | 10/1973 | Hamilton | C03B 23/0258 65/107 |
| 3,831,466 A * | 8/1974 | Hicks, Jr. | B26B 21/58 76/104.1 |
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,214,886 A * | 7/1980 | Shay | C03B 17/02 65/121 |
| 4,233,050 A * | 11/1980 | Comperatore | C03B 23/0258 65/104 |
| 4,287,018 A | 9/1981 | Gulati et al. | |
| 4,390,593 A * | 6/1983 | Olson | C03B 5/12 428/410 |
| 4,480,453 A | 11/1984 | Petkov et al. | |
| 4,778,504 A * | 10/1988 | Kulla | C03B 23/245 65/152 |
| 4,828,598 A * | 5/1989 | Imamura | C03B 23/023 65/104 |
| 4,828,900 A * | 5/1989 | Mouly | C03B 21/02 428/192 |
| 5,034,354 A | 7/1991 | Fine | |
| 5,100,452 A | 3/1992 | Dumbaugh, Jr. | |
| 5,342,426 A | 8/1994 | Dumbaugh, Jr. et al. | |
| 5,559,060 A | 9/1996 | Dumbaugh, Jr. et al. | |
| 5,637,363 A * | 6/1997 | Leray | B32B 17/10045 156/106 |
| 6,344,259 B1 | 2/2002 | Tanaka et al. | |
| 7,201,965 B2 | 4/2007 | Gulati et al. | |
| 7,514,149 B2 | 4/2009 | Bocko et al. | |
| 7,713,631 B2 * | 5/2010 | Yamada | B32B 17/10036 156/212 |
| 8,007,913 B2 | 8/2011 | Coppola et al. | |
| 8,110,279 B2 | 2/2012 | Shashidhar et al. | |
| 10,195,825 B2 * | 2/2019 | Chaparala | B32B 17/06 |
| 2004/0067343 A1 | 4/2004 | Beteille et al. | |
| 2008/0041833 A1 | 2/2008 | Cavallaro et al. | |
| 2008/0202167 A1 | 8/2008 | Cavallaro et al. | |
| 2010/0227949 A1 | 9/2010 | Tamai et al. | |
| 2011/0303287 A1* | 12/2011 | Lee | B32B 17/10036 136/259 |
| 2012/0055094 A1 | 3/2012 | Iacovoni et al. | |
| 2014/0036338 A1* | 2/2014 | Bareman | G02F 1/157 359/267 |
| 2014/0075996 A1* | 3/2014 | Dannoux | C03B 23/0256 65/107 |
| 2015/0030816 A1 | 1/2015 | Uemura et al. | |
| 2015/0368141 A1 | 12/2015 | Bergman et al. | |
| 2016/0297705 A1 | 10/2016 | DeMartino et al. | |

FOREIGN PATENT DOCUMENTS

| | | |
|---|---|---|
| WO | 98/14487 | 4/1998 |
| WO | 2009106883 A1 | 9/2009 |
| WO | 2010146389 A1 | 12/2010 |
| WO | 2014116788 A1 | 7/2014 |

OTHER PUBLICATIONS

English Translation of JP2015555261 Office Action dated Nov. 7, 2017; 2 Pages; Japanese Patent Office.

English Translation of CN201480006230.7 First Office Action dated Feb. 16, 2017, China Patent Office.

* cited by examiner

LAMINATED GLASS STRUCTURE AND METHOD OF MANUFACTURE

CROSS-REFERENCE TO RELATED APPLICATIONS

This application claims the benefit of priority under 35 U.S.C. § 365 of International Patent Application Serial No. PCT/US14/12677, filed on Jan. 23, 2014, which claims the benefit of priority under 35 U.S.C. § 119 of U.S. Provisional Application Ser. No. 61/757,144, filed on Jan. 26, 2013, and of U.S. Provisional Application Ser. No. 61/829,660, filed on May 31, 2013, the content of which are relied upon and incorporated herein by reference in their entireties.

BACKGROUND

The present disclosure relates generally to a laminated glass article or sheet and the methods to make it, more specifically to a laminated glass article or sheet having a finished edge imparting increased strength and break resistance at the finished edge, and the process to make it said article or sheet.

SUMMARY

According to one aspect of the present disclosure, a laminated glass structure is provided, the structure comprising one or more inner glass layers with at least one of the inner layers in tension and two outer glass layers in compression laminated on opposing sides of one or more inner layers to form a laminated glass structure, the laminated glass structure having mutually opposing major surfaces and being bounded by one or more edges, wherein one or both of the outer layers at least partially wrap around the one or more inner layers at one or more of the edges of the laminated glass structure.

Another aspect of the present disclosure includes a process for forming a laminated glass structure, the process comprising 1) providing a laminated glass structure comprising one or more inner glass layers with at least one of said inner layers in tension and two outer glass layers in compression laminated on opposing sides of the one or more inner layers, the structure having two opposing major surfaces and one or more edge surfaces at which edge surfaces the one or more inner glass layers and the two outer glass layers are exposed, 2) removing at least some glass from at least one of the one or more edge surfaces so as to produce a concavity in at least one of the one or more edge surfaces, and 3) applying heat to the at least one of the one or more edge surfaces so as to cause one or both of the outer layers to at least partially wrap around the one or more inner layers at the at least one of the one or more edge surfaces.

Further aspects, advantages, and features of the present disclosure will be apparent from the description and figures below.

DETAILED DESCRIPTION

A strengthened laminate is valuable because the surfaces of the glass are put in compression, desirably by an outer layer of glass having a low coefficient of thermal expansion (CTE) relative to an inner layer. This compression in the outer layer is accompanied by tension in the core of the laminate structure. Typically when such a laminated sheet is cut (such as by being scored and broken), this center tension is exposed, creating a weak spot and a potential point of breakage for the resulting glass article or sheet. Accordingly, a laminated glass structure having an edge with increased strength and damage resistance is desirable, and a method of forming such a laminated glass structure is needed.

Such advantages and such method are provided according to the present disclosure by a laminated glass structure comprising one or more inner glass layers with at least one of said layers in tension, and two outer glass layers in compression laminated on opposing sides of the one or more inner layers to form a laminated glass structure, with the laminated glass structure having mutually opposing major surfaces and being bounded by one or more edges. One or both of the outer layers at least partially wrap around the one or more inner layers at one or more of the edges of the laminated glass structure. Thus at least a portion of the edge is protected from being easily damaged and from having exposed surface area under tension.

Desirably, the outer layers wrap around the one or more inner layers to a distance of at least 1.5 times the thickness of the respective outer layer, more desirably to at least 2 times. For some applications, it is even desirable that the outer layers are wrapped around the one or more inner layers sufficiently to fully enclose the one or more inner layers at one or more of the edges of the laminated glass structure. Such structures and processes for making them are illustrated in FIGS. 1A through 1C.

Figures 1A, 1B, 1C:
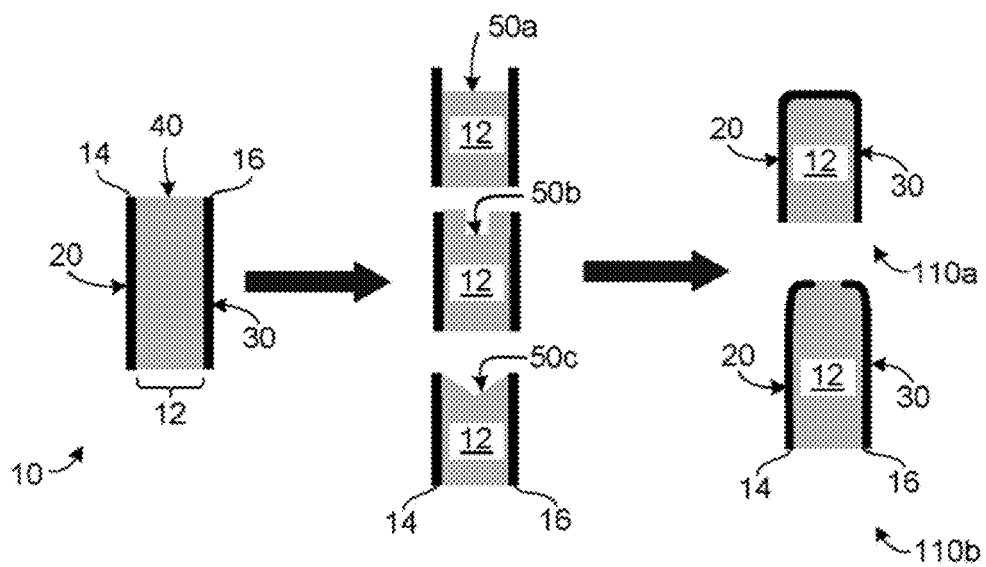
FIGS. 1A through 1C are diagrammatic cross-sections showing some aspects of a process for forming a laminate structure according to the present disclosure, and some embodiments of resulting laminate structures.

FIGS. 1A through 1C are diagrammatic cross-sections showing some aspects of a process for forming a laminate structure according to the present disclosure, and some embodiments of resulting laminate structures.

In FIG. 1A, a laminated sheet 10 is provided comprising one or more inner glass layers 12 (grey) with at least one of said inner layers in tension and two outer glass layers 14, 16 (black) in compression laminated on opposing sides of the one or more inner layers 12. The structure has two opposing major surfaces 23, 30 and one or more edge surfaces 40 (the edge surface at the top of FIG. 1A) at which edge surfaces 40 the one or more inner glass layers 12 and the two outer glass layers 14, 16 are exposed.

Next, as shown in FIG. 1B and indicated by the arrow leading to it from FIG. 1A, at least some glass is removed from at least one of the one or more edge surfaces 40 of the laminated sheet 10 of FIG. 1A, so as to produce a concavity 50a, 50b, or 50c in the edge surface 40. The concavity 50a, 50b, or 50c is a concavity extending in a direction perpendicular to the opposing major surfaces 20, 30 of the laminated sheet 10 (left to right in FIGS. 1A and 1B). The concavity 50a, 50b, or 50c may take various forms, three examples of which are shown in FIG. 1B, a broad notch 50a (leaving only the outer layers 14, 16 intact), a narrow notch 50b, and a V-structure notch 50c. The glass removal to form the concavity 50a, 50b, or 50c may desirably be by performed by a laser treatment such as laser ablation, by etching, by grinding, or by any combinations of these. Other techniques may also be applied.

Next, as depicted in FIG. 1C and indicated by the arrow leading to it from FIG. 1B, heat is applied to the edge surface 40 where the concavity 50a, 50b, or 50c was previously formed, so as to cause one or both of the outer layers 14, 16 to at least partially wrap around the one or more inner layers 12, as in finished laminated sheet 110b at the bottom of FIG. 1C, or to completely enclose the one or more inner layers 12, as in finished laminate sheet 110a the top of Figure. Heating may be performed by laser and/or flame heating. Other heating methods may also potentially be applied in combination or even alone, including such methods as radiant heating and plasma heating. The natural motion of the glass under heating and the CTE/surface tension effects is sufficient to cause the outer layers 14, 16 to bend in and partially or completely cover the inner layers 12, as shown in FIG. 1C. The heating need not be performed in exactly the orientation shown in FIG. 1C (edge up), although this is one alternative and may be preferred in some instances.

Figures 2A, 2B, 2C:
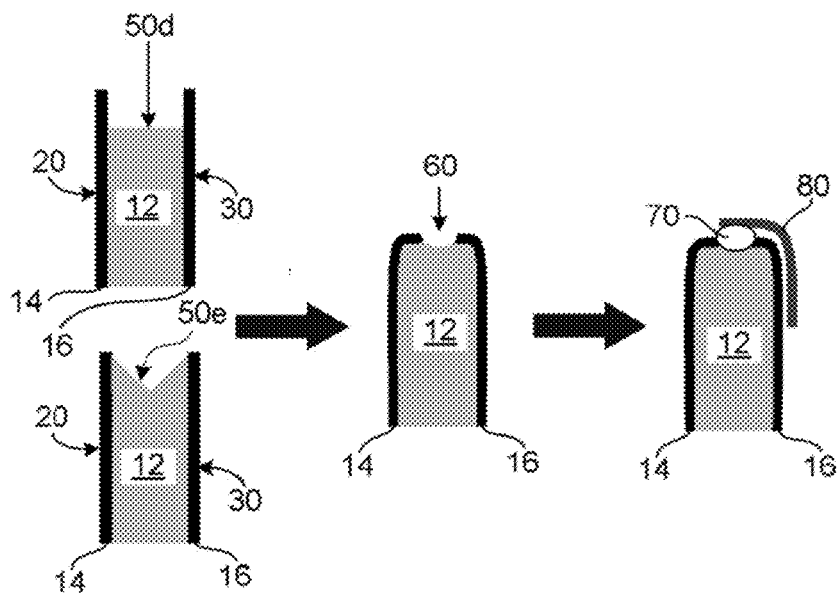
FIGS. 2A through 2C are diagrammatic cross-sections showing some steps of an alternative process to, or of a variation on the process shown in FIGS. 1A through 1C.

FIGS. 2A through 2C are diagrammatic cross-sections showing some steps of an alternative process to, or of a variation on the process shown in FIGS. 1A through 1C. In this alternative process, the starting shape of the concavity 50a, 50b or 50c of the step in FIG. 1B can be deeper, or otherwise modified, such as the deeper concavities 50d and 50e of FIG. 2A. Beginning with such deeper or otherwise modified concavities 50d or 50e, when the edge surface 40 is then heated, a partial seal with a void 60 at the center may be produced, as shown in FIG. 2B. This void 60 may then beneficially be used for positioning a protective and cushioning mounting interface, such as the one shown in FIG. 2C, comprising a protective sealing and mounting or fixing material 70 in cooperation with a frame 80. Such void 60 is not necessary, but may be a beneficial alternative in cases where a groove may be desired in the edge surface 40, for packaging, mounting, or other purposes.

Figures 3A, 3B:
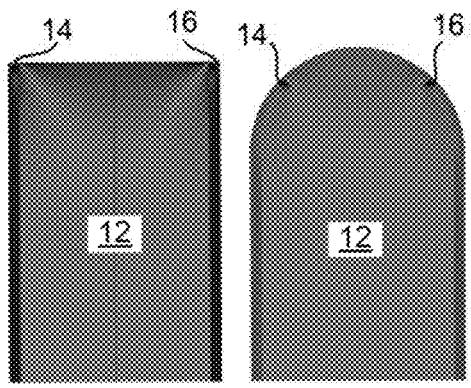
FIGS. 3A and 3B are computer-generated maps of cross-sectional stresses in an unfinished (FIG. 3A) and finished (rounded) edge (FIG. 3B).
Figures 4A, 4B:
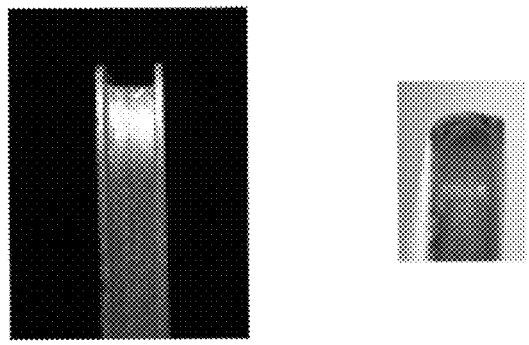
FIGS. 4A and 4B are digital photographs of a cross section of an edge of one laminate structure before heat treatment (4A) and after heat treatment (4B).
Figures 5A, 5B:
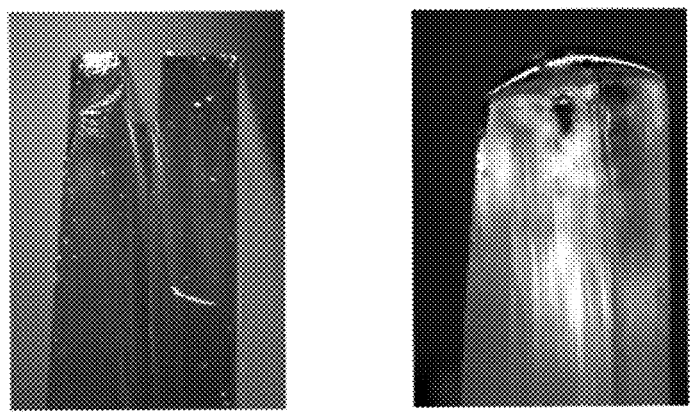
FIGS. 5A and 5B are digital photographs of a cross section of an edge of another laminate structure before heat treatment (5A) and after heat treatment (5B).

FIG. 3A are computer-generated maps of cross-sectional stresses in an unfinished (FIG. 3A) and finished (rounded) edge (FIG. 3B), with the one or more inner layers 12 at the finished edge being only partially enclosed by the outer layers 14, 16. As seen in FIG. 3B, the corners are effectively protected by the outer (compressive) layers, and the volume of high stress glass (depicted in green shades [with a small amount of even higher stress in red]) is reduced (relative to FIG. 3A).

Experimental

According to one present process embodiment, grinding was used to create the concavity, using the edge of a diamond saw. To apply heat to the edge, the edge was first preheated to 500-600° C. using a heated chuck and infrared radiant heaters. Next, the edge was moved through a stationary $CO_2$ laser beam at constant feed rate normal to the beam, with a programmed robot arm navigating the edges through the beam. The laser used produces 20-130 watts of power in a spot size having dimensions of about the width of the glass laminate by about 10 mm long in the feed direction. The feed rate was 5-20 mm/sec. (The laser power, laser spot size, and feed rate can be optimized based on the glass, the edge shape, and the extent of deformation required or desired.) After laser edge finishing, cooling is desirably performed at a controlled rate, or the glass may break. In this case, annealing at 650° C. for 1 hour was used to reduce stresses. Edges before heat treatment and edges resulting after heat treatment are shown in FIGS. 4A and 4B and 5A and 5B, with the laminate structure before heating shown in the "A" photographs, and the after heating laminate structure shown in the "B" photographs. As may be seen in FIGS. 4B and 5B, it was shown to be possible to completely enclose the inner layer(s) of the glass laminate structure using the processes of the present disclosure, without causing an increased thickness of the laminate structure. The resulting edges have a polished (a heat-polished) surface, with no machine tool marks or damage remaining.

What is claimed is:

1. A process for forming a laminated glass structure, the process comprising:
    providing a laminated glass structure comprising one or more inner glass layers with at least one of said inner layers in tension and two outer glass layers in compression laminated on opposing sides of the one or more inner layers, the structure having two opposing major surfaces and one or more edge surfaces at which edge surfaces the one or more inner glass layers and the two outer glass layers are exposed;
    removing at least some glass from at least one of the one or more edge surfaces so as to produce a concavity in at least one of the one or more edge surfaces, the concavity extending inward from the one or more edge surfaces in a direction parallel to the opposing major surfaces;
    applying heat to the at least one of the one or more edge surfaces so as to cause one or both of the outer layers to at least partially wrap around the one or more inner layers at the at least one of the one or more edge surfaces.

2. The process according to claim 1 wherein removing comprises grinding.

3. The process according to claim 1 wherein the step of removing comprises etching.

4. The process according to claim 1 wherein the step of removing comprises laser ablation.

5. The process according to claim 1 wherein applying heat comprises application of heat from a flame.

6. The process according to claim 1 wherein the step of applying heat comprises application of laser energy.

7. The process according to claim 1 wherein the step of applying heat comprises radiant heating.

8. The process according to claim 1 wherein the step of applying heat comprises plasma heating.

* * * * *